(12) United States Patent
Shen

(10) Patent No.: US 7,812,567 B2
(45) Date of Patent: Oct. 12, 2010

(54) BATTERY CHARGER STAND SET FOR MOTOR VEHICLE

(76) Inventor: Wen Hong Shen, P.O. Box 24-108, Taipei (TW)

( * ) Notice: Subject to any disclaimer, the term of this patent is extended or adjusted under 35 U.S.C. 154(b) by 47 days.

(21) Appl. No.: 12/157,552

(22) Filed: Jun. 12, 2008

(65) Prior Publication Data

US 2009/0309543 A1 Dec. 17, 2009

(51) Int. Cl.
*H02J 7/00* (2006.01)
*H02K 7/14* (2006.01)
*H04B 7/00* (2006.01)

(52) U.S. Cl. .................. 320/115; 320/113; 320/114; 310/50; 455/573

(58) Field of Classification Search ................. 320/115, 320/113, 114

See application file for complete search history.

(56) References Cited

U.S. PATENT DOCUMENTS 7,033,209 B2 * 4/2006 Swiatek et al. .............. 439/502

2008/0119241 A1 * 5/2008 Dorogusker et al. ........ 455/573

* cited by examiner

*Primary Examiner*—Edward Tso
*Assistant Examiner*—Yalkew Fantu
(74) *Attorney, Agent, or Firm*—Jackson IPG PLLC; Demian K. Jackson

(57) ABSTRACT

A battery charger stand set includes a battery charger stand, which has a top receiving open chamber and an electric charging circuit module disposed at one end of the top receiving open chamber and electrically connectable to the electric power circuit of a motor vehicle, a cell phone adapter insertable into the top receiving open chamber of the battery charger stand for electrically connecting a cell phone (PDA) to the electric charging circuit module of the battery charger stand, and a bluetooth transmitter receiver device insertable into the top receiving open chamber of the battery charger stand and electrically connectable to the electric charging circuit module for communication with an external cell phone (PDA) by means of bluetooth wireless communication technology.

2 Claims, 5 Drawing Sheets

US 7,812,567 B2

BATTERY CHARGER STAND SET FOR MOTOR VEHICLE

BACKGROUND OF THE INVENTION

1. Field of the Invention

The present invention relates to a cell phone battery charger stand and more particularly, to a battery charger stand set for use in a motor vehicle to hold a cell phone and to charge the battery of the cell phone.

2. Description of the Related Art

Cell phone and PDA are requisite mobile electronic deices to many people. There are commercially available battery charger stands for use in a motor vehicle for charging a cell phone or PDA. However, these battery charger stands are specifically designed for one particular module or cell phone or PDA. For charging the battery of a different model of cell phone or PDA, a different module of battery charger stand shall be used. It is not economic to prepare many battery charger stands for different cell phones and/or PDAs. German patent DE20001805 discloses a replaceable battery charger stand design. German patent DE202004004240 discloses a battery charger stand with a cell phone/PDA power cable. However, these designs are not convenient in use. Frequently plug and unplug the small parts may cause damage.

SUMMARY OF THE INVENTION

The present invention has been accomplished under the circumstances in view. According to one aspect of the present invention, the battery charger stand set comprises a battery charger stand, which has a top receiving open chamber and an electric charging circuit module disposed at one end of the top receiving open chamber and electrically connectable to the electric power circuit of a motor vehicle, and a cell phone adapter insertable into the top receiving open chamber of the battery charger stand for electrically connecting a cell phone (PDA) to the electric charging circuit module of the battery charger stand.

According to another aspect of the present invention, a bluetooth transmitter receiver device may be used and inserted into the top receiving open chamber of the battery charger stand to obtain the necessary working voltage from a motor vehicle through the electric charging circuit module for communication with an external cell phone (PDA) by means of bluetooth wireless communication technology.

DETAILED DESCRIPTION OF THE PREFERRED EMBODIMENT

Figure 1:
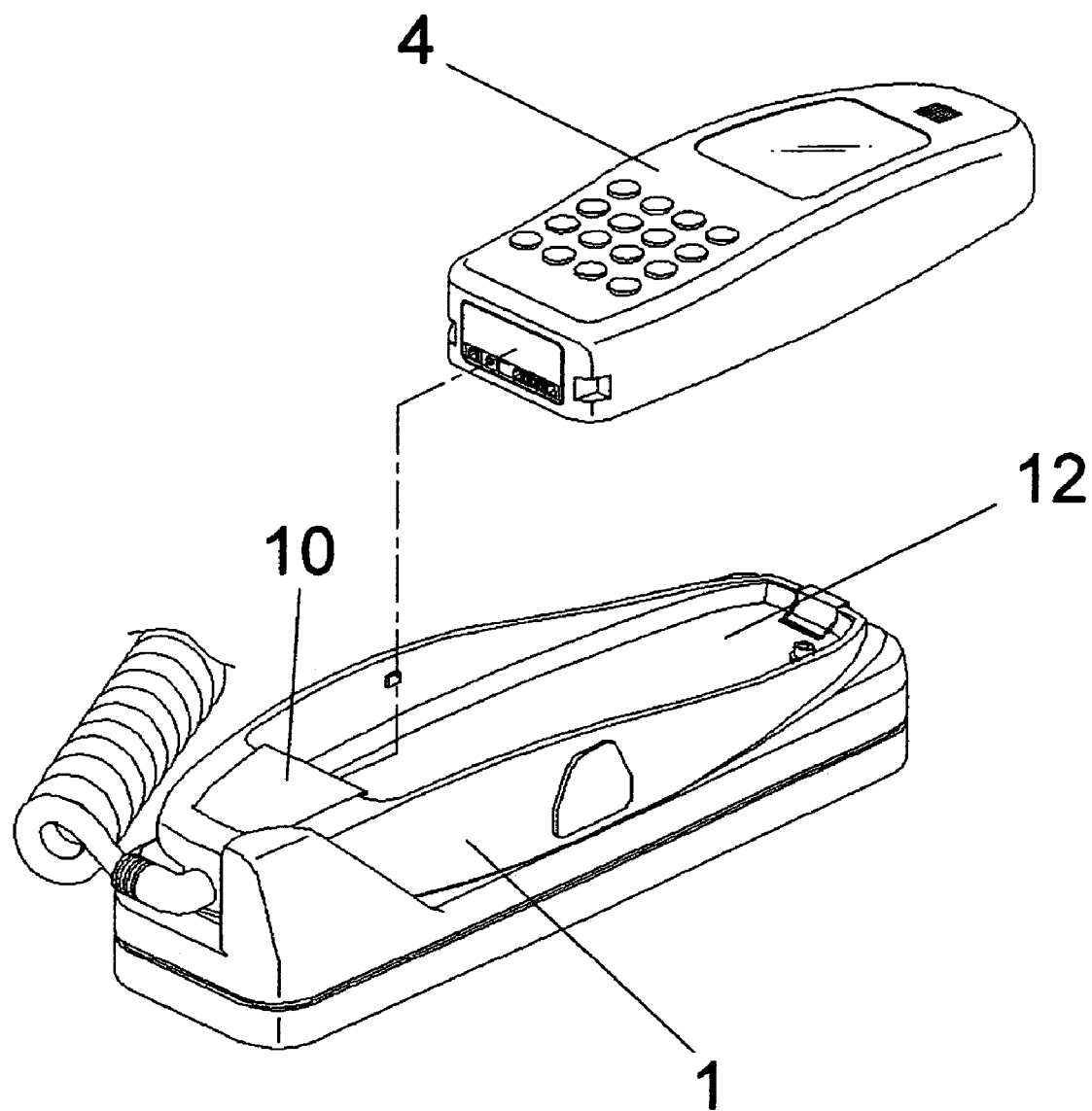
FIG. 1 is an exploded view of a battery charger stand and a cell phone according to the present invention.

Referring to FIGS. 1~5, a battery charger stand set in accordance with the present invention is shown comprised of a battery charger stand 1, a cell phone adapter 2, and a bluetooth transmitter receiver device 3. The battery charger stand 1 comprises a top receiving open chamber 12, and an electric charging circuit module 10 disposed at one end of the top receiving open chamber 12 and electrically connectable to the electric power circuit of a motor vehicle. The cell phone adapter 2 and the bluetooth transmitter receiver device 3 are selectively insertable into the top receiving open chamber 12 of the battery charger stand 1 to obtain the necessary working voltage of the motor vehicle. The cell phone adapter 2 has a top receiving open chamber 22 for accommodating a cell phone (or PDA) 4, and a connection interface 20 adapted for electrically connecting the loaded cell phone (or PDA) 4 to the electric charging circuit module 10 of the battery charger stand 1 so that the loaded cell phone (or PDA) 4 is charged with the battery power of the motor vehicle by the electric charging circuit module 10.

Referring to FIG. 1, a cell phone 4 can be directly inserted into the top receiving open chamber 12 of the battery charger stand 1 and electrically connected to the electric charging circuit module 10 so that the battery of the cell phone 4 can be charged by the battery power supply of the motor vehicle.

Figure 2:
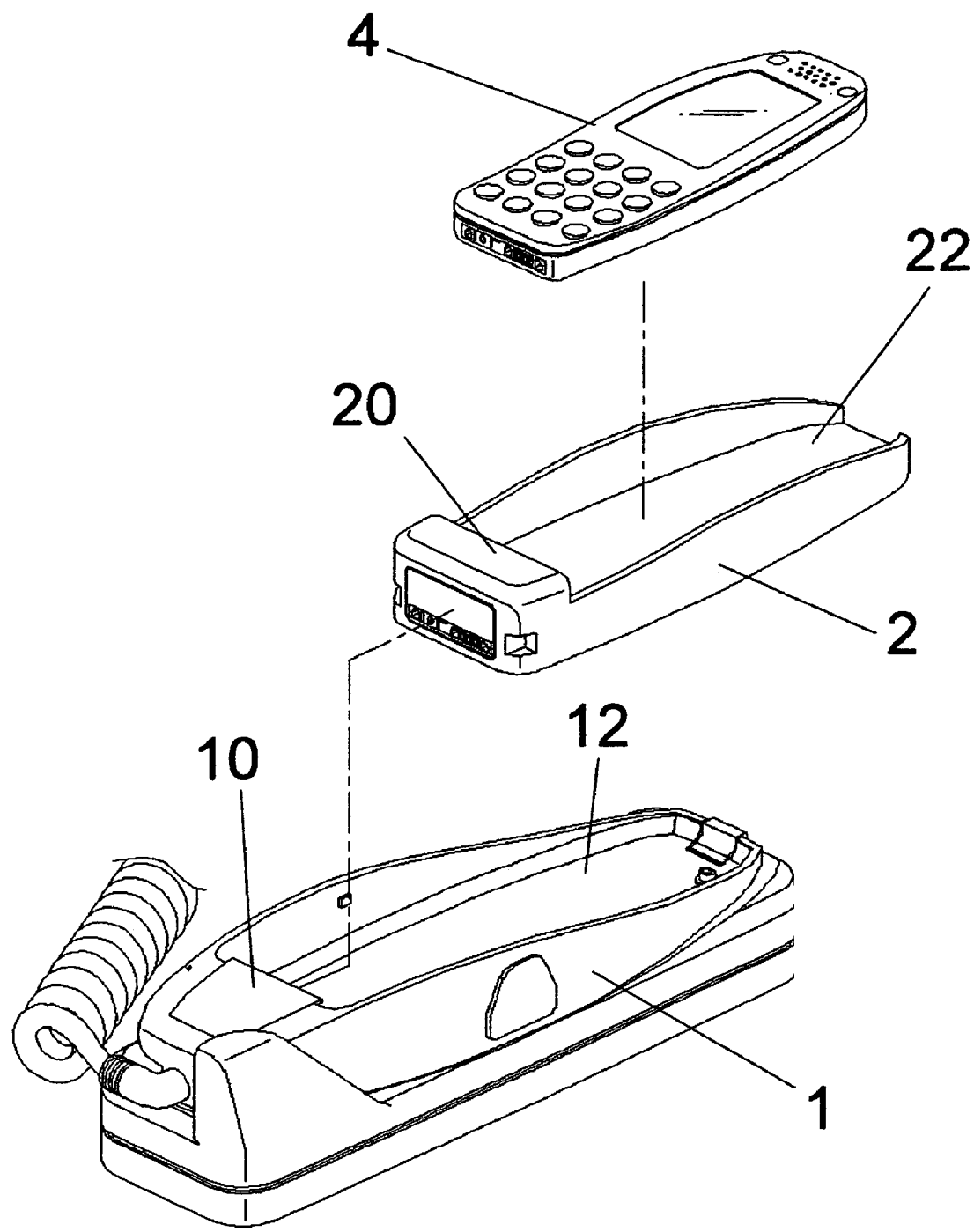
FIG. 2 is an exploded view of a battery charger stand, a cell phone adapter, and a cell phone according to the present invention.
Figure 3:
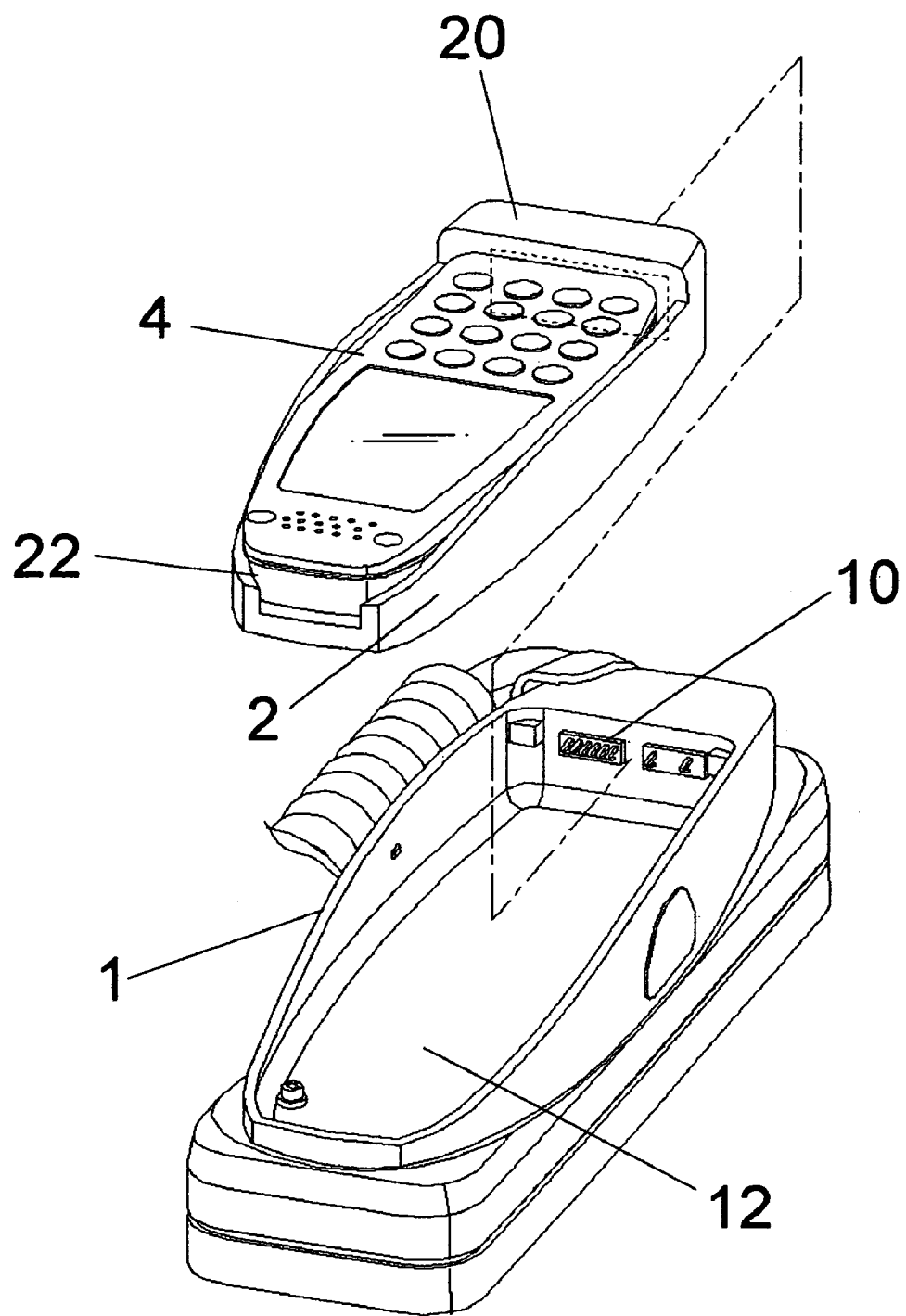
FIG. 3 corresponds to FIG. 2, showing the cell phone inserted into the cell phone adapter before installation of the cell phone adapter in the battery charger stand.

Referring to FIGS. 2 and 3, a different cell phone (PDA) 4 that does not fit the top receiving open chamber 12 of the battery charger stand 1 is used with the matching cell phone adapter 2. The cell phone (PDA) 4 is inserted into the top receiving open chamber 22 of the matching cell phone adapter 2 and electrically connected to the connection interface 20, and then the matching cell phone adapter 2 that carries the cell phone (PDA) 4 is inserted into the top receiving open chamber 12 of the battery charger stand 1 and electrically connected to the electric charging circuit module 10 so that the battery power supply of the motor vehicle can be transmitted to the connection interface 20 through the electric charging circuit module 10 to charge the battery of the cell phone (PDA) 4.

Figure 4:
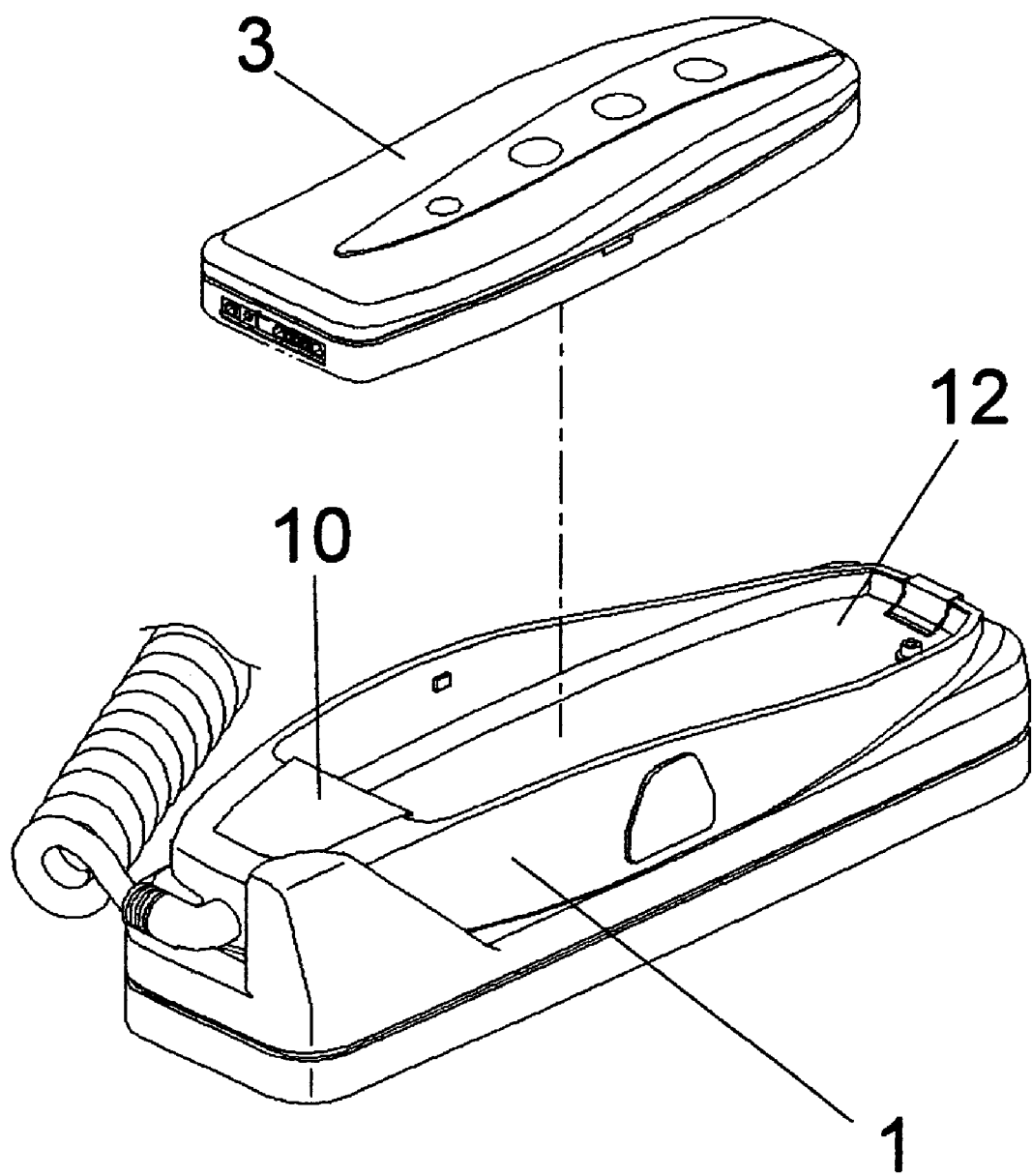
FIG. 4 is an exploded view of a battery charger stand and a bluetooth transmitter receiver device according to the present invention.
Figure 5:
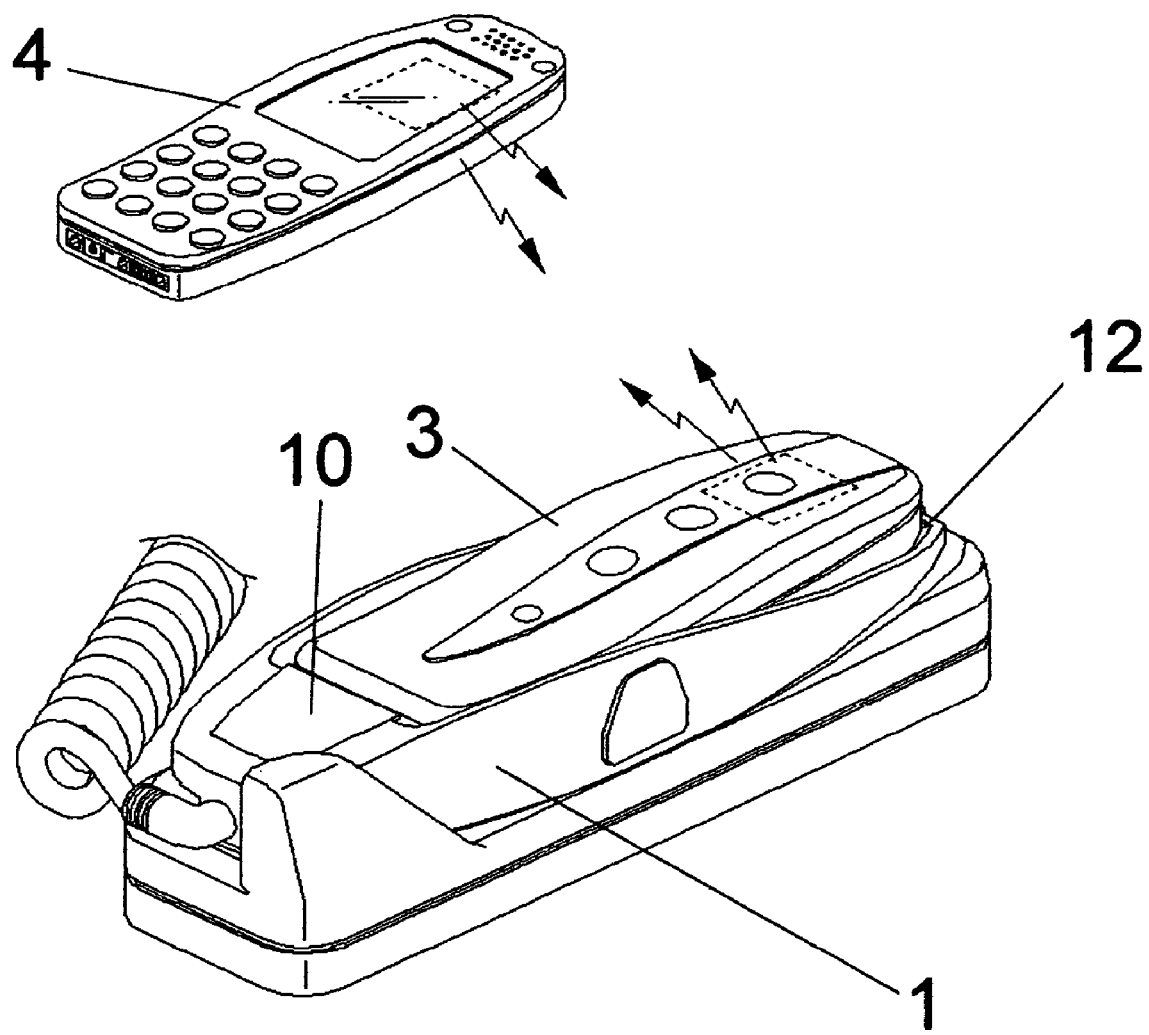
FIG. 5 corresponds to FIG. 4, showing the bluetooth transmitter receiver device installed in the battery charger stand for communication with a cell phone by means of bluetooth wireless communication technology.

Referring to FIGS. 4 and 5, after connection of the battery charger stand 1 to the battery power circuit of a motor vehicle, the bluetooth transmitter receiver device 3 can be inserted into the top receiving open chamber 12 of the battery charger stand 1 and electrically connected to the electric charging circuit module 10 to obtain the necessary working voltage from the motor vehicle so that the bluetooth transmitter receiver device 3 can be operated to communication with an external cell phone (or PDA) 4 by means of bluetooth wireless communication technology.

Although a particular embodiment of the invention has been described in detail for purposes of illustration, various modifications and enhancements may be made without departing from the spirit and scope of the invention. Accordingly, the invention is not to be limited except as by the appended claims.

The invention claimed is:

1. A battery charger stand set comprising:

a battery charger stand, said battery charger stand comprising a first top receiving open chamber configured to accept therein a first mobile electronic device, and an electric charging circuit module disposed at one end of said first top receiving open chamber and electrically connectable to the electric power circuit of a motor vehicle such that the first mobile electronic device directly connects to the electric circuit charging module; and a cell phone adapter insertable into the first top receiving open chamber of said battery charger stand, said cell phone adapter comprising a second top receiving open chamber configured to accept therein a second mobile electronic device, and a connection interface adapted for electrically connecting the second mobile electronic device to the electric charging circuit module of said battery charger stand via the connection interface of the adapter.

2. The battery charger stand set as claimed in claim 1, further comprising a bluetooth transmitter receiver device insertable into the first top receiving open chamber of said battery charger stand and directly electrically connectable to the electric charging circuit module of said battery charger stand.

* * * * *